United States Patent [19]

Kerman et al.

[11] 4,185,173
[45] Jan. 22, 1980

[54] KEY TELEPHONE CALL SIGNALLING CIRCUIT

[75] Inventors: Stephen E. Kerman, Merrick, N.Y.; Fumikazu Hamatani, Kawasakishi, Japan, Fumio Tsutsumi, Takasakishi, Japan; Yuji Tanaka, Kawasakishi, Japan

[73] Assignees: Nippon Tsū Shin Kōgyō K.K., Kawasaki, Japan; TIE/Communications, Inc., Stamford, Conn.

[21] Appl. No.: 925,821

[22] Filed: Jul. 18, 1978

Related U.S. Application Data

[63] Continuation of Ser. No. 728,592, Oct. 1, 1976, abandoned.

[51] Int. Cl.² ............................................. H04M 1/72
[52] U.S. Cl. .................. 179/99 P; 179/18 BF; 179/99 LS
[58] Field of Search ........... 179/18 AD, 18 BF, 81 B, 179/1 H, 1 HF, 99

[56] References Cited
U.S. PATENT DOCUMENTS

| | | | |
|---|---|---|---|
| 3,763,326 | 10/1973 | Murto et al. | 179/99 |
| 3,872,261 | 3/1975 | Shinoi et al. | 179/18 BF |
| 3,872,262 | 3/1975 | Kerman | 179/99 |
| 3,894,197 | 7/1975 | Cowpland et al. | 179/81 B |
| 3,904,834 | 9/1975 | Shinoi et al. | 179/99 |
| 3,920,902 | 11/1975 | Matsuo et al. | 179/99 |
| 4,081,624 | 3/1978 | Kerman et al. | 179/18 AD |

Primary Examiner—Bernard Konick
Assistant Examiner—Randall P. Myers
Attorney, Agent, or Firm—Francis N. Carten

[57] ABSTRACT

The disclosure is directed to a calling circuit which controls the connection of two different audio signal sources to a single audio signal transmission path for broadcasting the audio signals over a telephone set loudpseaker as well as controlling the energization of indicators in the telephone set and at the main control circuit. Only four conductors are used to connect the telephone set with the main control circuit, two of which are power supply conductors which may supply other circuits as well.

4 Claims, 3 Drawing Figures

TO OTHER STATIONS  TO OTHER CIRCUITRY

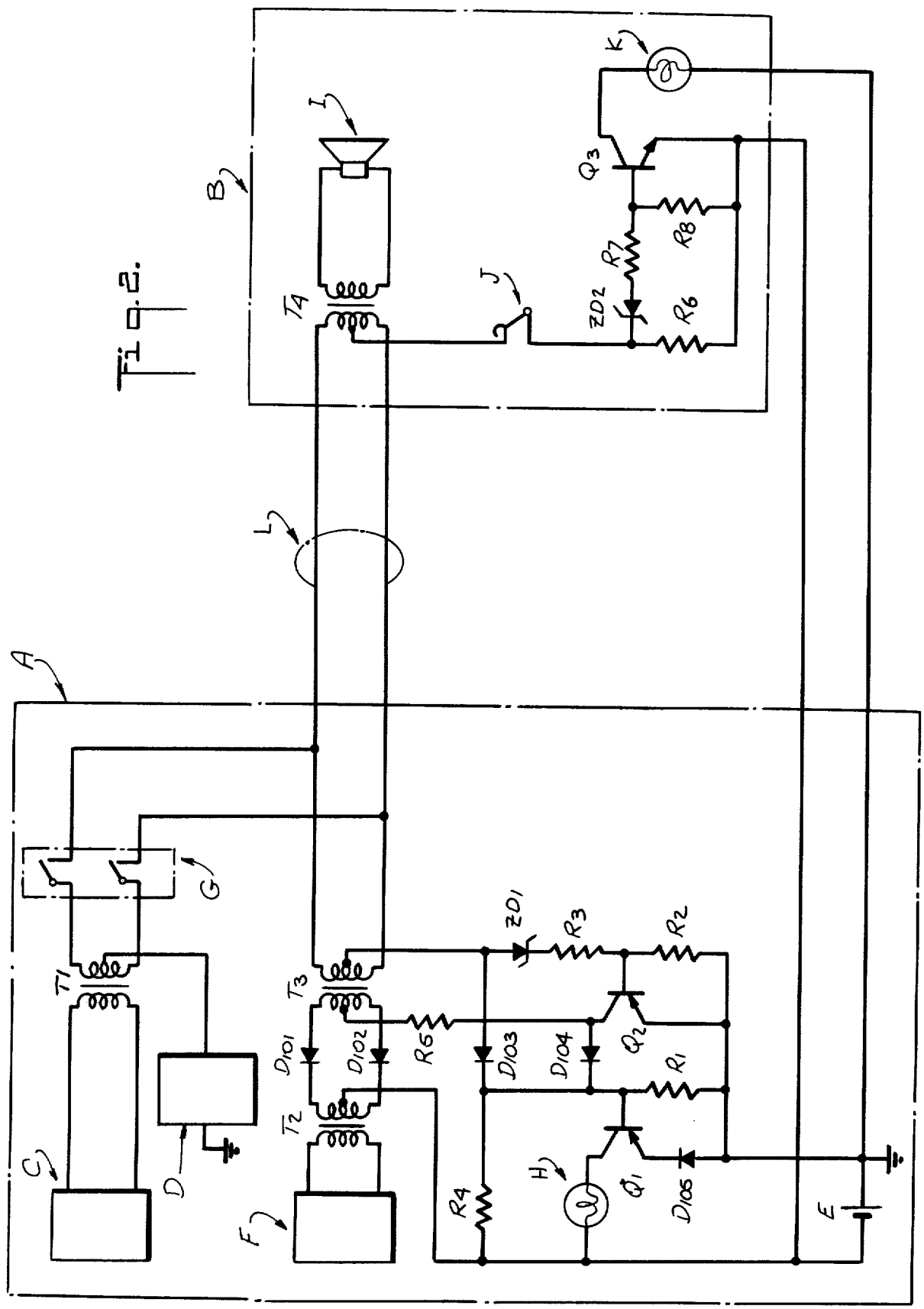

KEY TELEPHONE CALL SIGNALLING CIRCUIT

This is a continuation of application Ser. No. 728,592 filed Oct. 1, 1976, now abandoned.

BACKGROUND OF THE INVENTION

1. Field of the Invention

This invention relates to key telephone system electrical circuitry. In particular the invention relates to a calling circuit in which audio signals, lamp signals and control signals are superimposed over four conductors between a telephone station set and a main control circuit.

2. Description of the Prior Art

A prior art circuit similar to the circuit shown in FIG. 1 of the drawings, used eight conductors to connect a main apparatus 1 and a telephone set 2. Over these eight conductors, the prior art calling circuit passed two types of audio signals, as well as control signals and lamp signals. In FIG. 1, box 4 represents a first audio signal source, such as a musical broadcast or a voice paging signal. Box 5 represents a second audio signal source, such as a chime or bell signal to alert the telephone station user that the station is being called. The circuit labeled 3 is a detector which detects the state of the hook switch 11 of the telephone set and is associated with the first audio signal source 4 via signal transfer path 20. The circuit labeled 6 is a detector which detects the state of the hook switch 11 of the telephone set and is associated with the second audio signal source 5 via signal transfer path 21. The circuit labeled 7 is a square wave lamp signal source. The circuit 8 is an indicator which indicates the calling state and the hook switch state of the telephone set 2. The relay contacts 9 are operated when a control relay is energized by telephone set 2 being in a called state. Speaker 10 is for the broadcasting of the first and second audio signals. The hook switch contact is labeled 11. Indicator 12 indicates the called state, and diodes D1 and D2 are reverse current prevention diodes.

When the hook switch 11 is down, (i.e., the set is "on-hook") the first audio signal is broadcast from the speaker 10 because current flows from the power source E via the break contact of the hook switch 11 to detector 3 and the first audio signal source is connected with the first audio signal transmission path 20.

When the hook switch 11 is raised and detector 3 becomes deactivated, the broadcast is suspended and indicator 8 is energized from power source E via diode D1 and the hook switch make contact.

When the hook switch 11 of telephone set 2 is down, and the set is called, the relay contacts 9 close and current flows to detector 6 via the make contacts of the relay. After the second audio signal source 5 is connected to the second audio signal transmission path 21, the second audio signal is broadcast from the speaker instead of the first audio signal. Lamp signal source 7 is connected to indicator 8 of the main apparatus via the make contact of the relay and diode D2, and to indicator 12 of the set, and both indicators flash on and off. When the hook switch is raised, detector 6 becomes deactivated, relay 9 is released by its control circuit, broadcasting is suspended, and indicator 12 extinguishes while indicator 8 lights steadily.

Thus, prior art calling circuits required six signal conductors and two power supply conductors to connect station sets with the main apparatus in order to satisfy the several transmission functions of two types of audio signals, detection of the state of the telephone set hook switch, the indication of the state of use of the telephone set, and the lamp signal transmission.

It is therefore a general object of this invention to provide an improved calling circuit for use in a key telephone system.

It is a more specific object of this invention to provide a calling circuit for use with a key telephone system which allows between key telephone station and main apparatus, transmission of two types of audio signals, detection of the state of a telephone set hook switch, and transmission of indicator control signals by means of only two signal and two power supply conductors.

SUMMARY OF THE INVENTION

The invention is for a calling circuit comprising a main control circuit interconnected to a telephone station set by means of only four conductors. Two of these conductors form an audio transmission path, the other two conductors being used as power supply and ground reference leads. A loudspeaker electromagnetically coupled to the audio transmission path and a hook switch and a station set indicator connected to the main control circuit via the two power supply leads are located in the telephone station set.

In the main control circuit, first and second audio signal sources, a square wave lamp signal source and a control circuit indicator are provided. Also provided in the main control circuit is a relay contact means for connecting the second audio signal source and the square wave lamp signal source to the two conductor audio transmission path when the station set is being called and the hook switch is closed.

Diode switch means are provided in the main control circuit for coupling the loudspeaker in the station set via the audio transmission path to the first audio signal source. Control circuit means are provided for preventing the energization of the station set indicator and the control circuit indicator when the telephone set hook switch is closed and the telephone set is not being called.

Said control circuit means, responsive to the square wave lamp signal which is applied to the audio transmission path, energizes the station set indicator on the alternate half-cycles of the square wave lamp signal, energizes the control circuit indicator on the other alternate half-cycles of the square wave lamp signal, prevents the transmission of the first audio signal via the audio transmission path to the loudspeaker, and enables the transmission of the second audio signal generated by the second audio signal source via the audio transmission path to the loudspeaker, when the telephone hook switch is closed and the telephone set is being called.

Said control circuit means is also for controlling the diode switch means to disconnect the first audio signal source from the audio signal transmission path when the telephone hook switch is open. Not shown are known means for controlling the relay contact means to disconnect the second audio signal source and the square wave lamp signal source from the audio transmission path when the telephone hook switch is open.

BRIEF DESCRIPTION OF THE DRAWINGS

This, as well as its objects and features will be better understood by reference to the following detailed description of the preferred embodiment of this invention taken in conjunction with the accompanying drawings in which:

FIG. 3 shows a voltage waveform generated by lamp signal generator D shown in FIG. 2.

DESCRIPTION OF THE INVENTION

Figure 1:
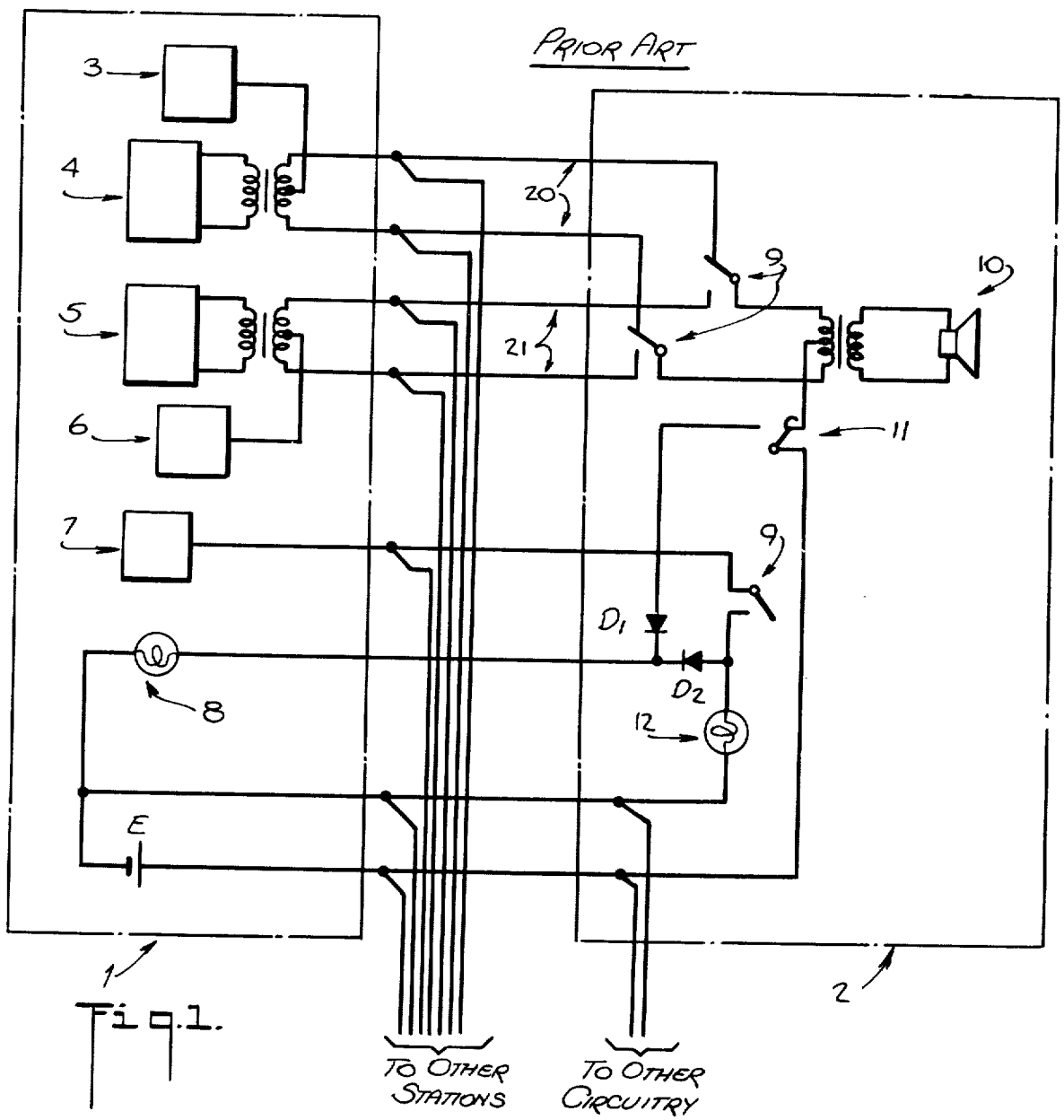
FIG. 1 shows a prior art circuit for controlling the connection of two audio signals to a telephone station and controlling an indicator in a main apparatus location and another in the telephone station.
Figure 2:
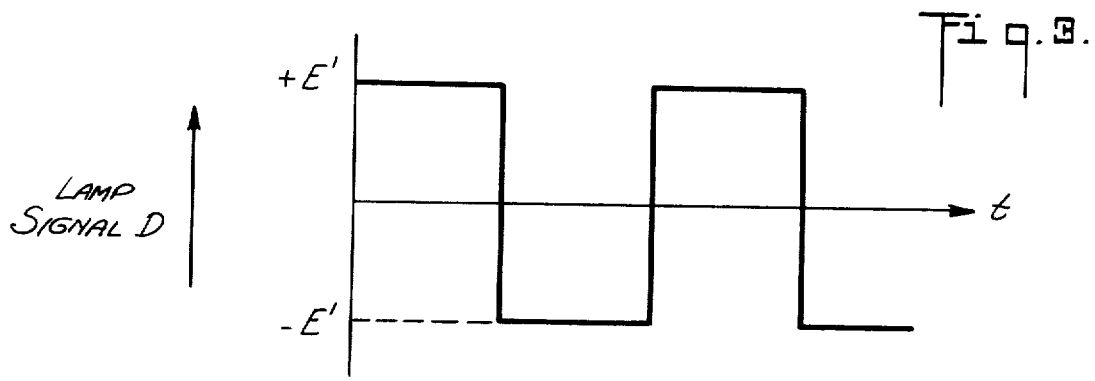
FIG. 2 shows a circuit, constructed in accordance with the invention for controlling the connection of two audio signals to a telephone station, controlling an indicator in the telephone station, and controlling an indicator in a main control circuit location.

FIG. 2 is a preferred embodiment of the present invention. The circuit enclosed by broken lines labeled A is located at a central place and is the part of the main apparatus depicting the present invention. The circuit enclosed by lines B is located at a telephone set. A first audio signal source is labeled F. A square wave lamp signal source is labeled D. A power source of the entire apparatus is labeled E. A second acoustic signal source is labeled C. Relay contacts which operate when telephone set B is in the called state are labeled G.

An indicator in the main apparatus which monitors the calling state and the hook switch state of telephone set B is labeled H. A speaker which broadcasts the first and second audio signals at telephone set B is labeled I. A normally closed hook switch is labeled J. An indicator in the telephone set B which indicates the called state of telephone set B is labeled K.

A two conductor signal transmission path is labeled L. A coupling transformer which connects the second audio signal source C to the signal transmission path L is labeled T1. Coupling transformers T2 and T3 connect audio signal source F to the signal transmission path L, and diodes D101 and D102 are connected so as to function as a diode switch. Drive transistor Q1 controls current flow to indicator H. Base bias resistors R1 and R4 provide biasing for Q1. Transistor Q2 drives the diode switch D101, D102. Base bias resistors R2 and R3 bias transistor Q2 which controls the current flowing into the diode switch D101, D102 via resistor R5. Diode D104 prevents Q1 from conducting when Q2 is conducting. Diode D103 turns Q1 off when the positive voltage of power source E is present in the signal transmission path L. Zener diodes ZD1 and ZD2 are selected so that the sum of their constant breakdown voltages will exceed the voltage level of power source E. Diode D105 drops the emitter potential of transistor Q1 sufficiently below ground potential to permit the base current of transistor Q1 to be cut off by Q2 and diode D104 in series.

Coupling transformer T4 connects speaker I to the signal transmission path L. Transistor Q3 controls current flow to indicator K. Base bias resistor R6 limits current flow to the base of Q2. Base bias resistors R7 and R8 provide biasing for transistor Q3. An explanation of the circuit operation of the invention follows.

Telephone on-hook and not being called

When hook switch J of telephone set B is closed (handset on-hook), base current flows from the emitter of Q2 through its base resistor R3, Zener diode ZD1, the center-tap of transformer T3, the secondary winding of T3, signal transmission path L, the center-tap of transformer T4, the hook switch J, through resistor R6 and back to cell E, so that Q2 is conducting. Consequently transistor Q1 does not conduct and indicator H is not energized. Current flows through the emitter-collector path of transistor Q2 through resistor R5 to a diode switch comprising diodes D101 and D102, the primary winding of T3 and the secondary winding of T2. Current flow causes the diode switch to turn on with the result that the audio signal from source F is transmitted via signal transmission path L and is broadcast over speaker I of telephone set B. Base current in Q3 does not flow because the voltage magnitude of power source E is insufficient to break down both Zener diode ZD1 and ZD2 simultaneously. Consequently, transistor Q3 is not turned on and indicator K is not energized.

In summary, when the telephone is on-hook and not being called, audio signal F is transmitted, and indicators K and H are both off.

Telephone on-hook and being called

When telephone set B is called and hook switch J is closed, relay G contacts close, and a square wave lamp signal is applied from lamp signal source D via the secondary side center-tap of transformer T1 and then to signal transmission path L. Lamp signal source D generates a square wave lamp signal of magnitude of E' volts about a zero or reference level taken to be the positive side of power source E. FIG. 3 shows the square wave form voltage generated by D. The magnitude E' is selected so that the sum of $|E'|$ and the voltage magnitude $|E|$ of power source E is greater than the breakdown voltage $V_{ZD2}$ of Zener diode ZD2. Equation (1) indicates the relationship:

$$|E'|=|E|>|V_{ZD2}|. \quad (1)$$

Thus on positive half cycles of the lamp signal source D, there is sufficient potential from the negative power source E at the anode and the positive lamp signal source at the cathode to overcome the breakdown voltage of ZD2. Transistor Q3 is turned on allowing emitter-collector current to flow which turns on indicator K during positive half-cycles. Indicator K is off during negative half-cycles of lamp signal source D.

In addition the breakdown voltage of Zener diode ZD1 is selected to be greater than $|E'|$, $$|V_{ZD1}|>|E'| \quad (2)$$

Thus, transistor Q2 is turned off by the connection of the square wave signal across the Zener diode ZD1 and transistor Q2 since the voltage at ZD1 anode is always insufficiently negative to permit ZD1 to conduct. This turns off the diode switch thereby disconnecting the audio source F from the speaker I. Only the audio signal from source C is broadcast from speaker I.

Transistor Q1 is turned off during the positive half cycles of lamp signal source D via diode D103, but is turned on during the negative half-cycles via resistor R4. Thus indicator H is energized by emitter-collector current flow in Q1 and is one hundred-eighty degrees out of phase with the energization of indicator K.

In summary, when the telephone set is on-hook and is being called, indicator K flashes on the positive half-cycles of lamp signal source D, indicator H flashes on the negative half-cycles of lamp signal source D, audio signal source F is disconnected from speaker I, and audio signal source C is connected to speaker I.

Telephone off-hook in answer to a call

When relay contacts G are closed, as when the telephone set is being called, and the hook-switch J is then opened, transistor Q3 can no longer conduct because its base bias circuit is interrupted. The second audio signal continues broadcasting in the circuit shown. However in a similar manner to prior art circuits, relay contacts G can be controlled by the opening and closing of the hook switch so that the broadcast from source C may be stopped when the telephone is answered in response to a call.

Telephone off-hook, not in response to a call

When no call is being received by telephone station B, relay contacts G are open and the audio signal from source F is being transmitted over speaker I. When hook switch J is lifted, the base current to transistor Q2 has no path through which to flow. Thus Q2 is turned off, which turns off the diode switch, and the audio signal from source F is no longer broadcasted. The base current for Q1 flows in R4, turning transistor Q1 on, thereby energizing indicator H.

In summary when the telephone set goes off-hook not in response to a call, the audio signal from source F is disconnected and only indicator H is energized.

The advantages of the pesent invention, as well as certain changes and modifications to the disclosed embodiment thereof, will be readily apparent to those skilled in the art. It is the applicant's intention to cover all those changes and modifications which could be made to the embodiment of the invention herein chosen for the purpose of the disclosure without departing from the spirit and scope of the invention.

What is claimed is:

1. A calling circuit comprising, an audio transmission path of two conductors and two common power supply conductors, all extending from a main control circuit to a telephone station set,
    a loudspeaker coupled to said audio transmission path, a hookswitch and a station set indicator in the telephone station set connected to the main control circuit via said audio transmission path and via said two power supply conductors,
    first and second audio signal sources, an alternating lamp signal source and a control circuit indicator in the main control circuit,
    a first switching means for coupling said loudspeaker in the station set via said audio transmission path to said first audio signal source,
    a second switching means for connecting said second audio signal source and said alternating lamp signal source to said audio transmission path of two conductors when said station set is being called and said hook switch is closed,
    control circuit means for preventing the energization of said station set indicator and said control circuit indicator when said hook switch is closed and the telephone set is not being called; for responding to the alternating lamp signal generated by said alternating lamp signal source and applied to said audio transmission path (1) by energizing said station set indicator periodically during first half-cycles of said alternating lamp signal, (2) by energizing said control circuit indicator periodically during second half-cycles of said alternating lamp signal, and (3) by controlling said first switching means to decouple said first audio signal source from said audio transmission path; and for constantly energizing said control circuit indicator when said hook switch is open.

2. The calling circuit of claim 1 wherein said control circuit means comprises,
    a source of direct current voltage connected to said two power supply conductors,
    a first transistor connected in the main control circuit, with a base bias circuit which comprises a first zener diode in series with at least one resistor, the emitter of said first transistor connected to one terminal of said source of direct current voltage and said base bias circuit connected between said audio transmission path and the base of said first transistor,
    a second transistor connected in the telephone set, the emitter-collector path being connected in series with said station set indicator to said two power supply conductors, the base of said second transistor being connected in series with a base bias circuit comprising a second zener diode through said hook switch to said audio transmission path, a bypass resistor being provided between said hook switch and the emitter of said second transistor, the emitter and bypass resistor being connected to the other terminal of said source of direct current voltage, wherein the magnitude of said source of direct current voltage is sufficient to overcome the reverse breakdown voltage level of said first zener diode, but insufficient to cause reverse current to flow in said second zener diode, depriving said second transistor of base bias current and preventing current flow in said emitter-collector path in series with which said station set indicator is connected, and whereby power supply current flows in said by-pass resistor and the base bias circuit of said first transistor,
    a third transistor connected in the main control circuit, said control circuit indicator being connected in series with said source of direct current voltage in the emitter-collector path of said third transistor, the base of said third transistor being connected to the collector of said first transistor whereby conduction of said first transistor deprives the base of said third transistor of base bias current such that said third transistor does not conduct and said control circuit indicator is not energized.

3. The calling circuit of claim 2 wherein said first switching means is a diode switch means comprising,
    first and second coupling transformers, the primary winding of said first transformer being connected to said first audio signal source, the secondary winding of said second transformer being connected to said audio transmission path of two conductors, one end of the secondary winding of said first transformer being connected to one end of said primary winding of said second transformer by means of a first diode, the other end of said secondary winding of said first transformer being connected to the other end of said primary winding of said second transformer by means of a second diode, said diodes both being poled so as to permit parallel direct current flow in the circuit formed by first and second center tap connections of said secondary winding of said first transformer and said primary winding of said second transformer, respectively, via said diodes,
    said first center tap connection to said primary winding of said second transformer being connected to the collector of said first transistor via a resistor, and said second center tap connection to said secondary winding of said first transformer being connected to said other terminal of said source of direct-current voltage, wherein the conduction of said first transistor causes direct current to flow through both of said diodes, thereby biasing them into the conductive state which allows small alternating current signals to pass between said secondary winding of said first transformer and said primary winding of said second transformer.

4. The calling circuit of claim 3 wherein said alternating lamp signal is a square wave and is applied to said base of said second transistor in the telephone set via said audio signal path, said square wave lamp signal being of a magnitude that on half-cycles in which the voltage of said square wave lamp signal is additive to the voltage level of said source of direct current voltage, the combined voltage level of said square wave lamp signal and said source of direct current voltage exceeds the breakdown level of said second Zener diode, thereby turning on said second transistor and said station set indicator, but on half-cycles in which the voltage of said square wave lamp signal is subtractive from the voltage level of said source of direct current voltage, said second Zener diode is not turned on, and wherein said square wave lamp signal is applied across said base bias network and emitter of said first transistor in the main control circuit, said magnitude of said square wave lamp signal being insufficient both during said additive and subtractive half-cycles to pass through said base bias circuit and turn on said first transistor, thereby cutting off said first transistor, thereby cutting off said diode switch means and electrically decoupling said first audio signal source from said audio transmission path, and wherein said square wave lamp signal is applied across the base-emitter junction of said third transistor whereby said third transistor is turned on during those half-cycles where said third transistor is forward biased by said square wave lamp signal and turned off during the opposite half-cycles when said third transistor is reverse biased by said square wave lamp signal, with the result that the said control circuit indicator in the collector circuit of said third transistor flashes in synchronization with the alternations of said square wave lamp signal.

* * * * *